United States Patent
Klaus et al.

[19]

[11] Patent Number: 6,056,455
[45] Date of Patent: May 2, 2000

[54] PROGRAMMABLE PRINT HEAD AND MULTI-LEVEL ENCODING OF PRINT HEAD DATA

[75] Inventors: Richard I. Klaus; Mark S. Hickman, both of Vancouver, Wash.

[73] Assignee: Hewlett-Packard Company, Fort Collins, Colo.

[21] Appl. No.: 09/062,244

[22] Filed: Apr. 17, 1998

[51] Int. Cl.[7] .................................................. B41J 23/20
[52] U.S. Cl. ............................ 400/176; 400/76; 400/70; 400/61
[58] Field of Search ................................... 347/9, 11, 44, 347/5, 20; 395/108, 104; 400/176, 61, 70, 76

[56] References Cited

U.S. PATENT DOCUMENTS

| | | |
|---|---|---|
| 4,567,570 | 1/1986 | Peer .......................................... 364/900 |
| 5,696,685 | 12/1997 | Lee et al. ............................. 364/464.18 |
| 5,815,179 | 9/1998 | Silverbrook ................................ 347/59 |
| 5,923,345 | 7/1999 | Imai ........................................... 347/11 |

*Primary Examiner*—John S. Hilten
*Assistant Examiner*—Charles H. Nolan, Jr.

[57] ABSTRACT

A printer has a print head with multiple nozzles and an encoder to encode print head data into firing bits used to determine various firing patterns of the print head nozzles. A decoder is integrated on the print head to decode the firing bits into firing pulses used to fire selected print head nozzles. The encoder encodes the print head data in such a manner that there are fewer firing bits than there are possible firings controlled by the firing bits. For instance, the encoder encodes the print head data such that "n" firing bits define $2^n$ firing levels (where "n" is an integer), with each firing level defining a different number of firings. With the multi-level encoding, the encoder is able to control more than n possible firings with each n firing bits.

19 Claims, 7 Drawing Sheets

Level 0

Level 1

Level 2

Level 3

Level 0

Level 1

Level 2

Level 3

Pass 1 - Level 3         Pass 2 - Level 3

PROGRAMMABLE PRINT HEAD AND MULTI-LEVEL ENCODING OF PRINT HEAD DATA

TECHNICAL FIELD

This invention relates to printers, and more particularly, to programmable print heads and methods for encoding print head data for the programmable print heads.

BACKGROUND

Printers are constantly being pushed to perform more tasks locally, provide better print quality, and operate at higher printing speeds. Today's printers have far greater print head scan rates and fire far more dots within each scan than their predecessors. These requirements increase the amount of data being handled within the printer within an increasingly shorter time frame. With print head technology advances, it is not uncommon for a single print head to have 1200 nozzles, which enables better resolution and print quality.

Conventionally, one bit of print data is required to fire each corresponding nozzle. Accordingly, for a 1200-nozzle print head, 1200 bits of data are required to fire (or not fire) all 1200 nozzles. Suppose the pen is operated at 100 kHz. For this rate, the printer needs to send 1200 bits of data every 10 $\mu$s. This yields a whopping data rate of 120 Mb/sec. Now, suppose the printer has more than one pen. For a common four-pen system, the data rate becomes 480 Mb/sec. Unfortunately, data bandwidth is not infinite and such high data rates are practically unavailable at this time.

Current print head technology implements firing logic on the print head. The firing logic is formed into the silicon wafer that forms the nozzles and the heated firing elements. This reduces the number of connections to the pen and allows the print head to decode data at least partially on the fly. The firing logic still requires, however, the one data bit per nozzle ratio. As a result, the current pen technology effectively worsens the data rate problem.

Accordingly, there is a need for a new approach to driving high quality pens without exceeding practical data rates.

A countervailing concern is the ever present pressure to lower the cost of printers. The marketplace continues to drive printer prices down and thus, any solution to the data throughput problem must be cost sensitive.

SUMMARY

This invention concerns a multi-level encoding technique that enables fewer data bits to effectively control multiple firings, thereby breaking the traditional one bit-to-one nozzle relationship. In one implementation, the printer has a print head with multiple nozzles and an encoder to encode print head data into firing bits used to determine various firing patterns of the print head nozzles. A decoder is integrated on the print head to decode the firing bits into firing pulses used to fire selected print head nozzles.

The encoder encodes the print head data in such a manner that there are fewer firing bits than there are possible firings controlled by the firing bits. For instance, the encoder encodes the print head data such that "n" firing bits define $2^n$ different possible firing levels (where "n" is an integer), with each firing level defining a different number of firings. With the multi-level encoding, the encoder is able to control more than n possible firings with each n firing bits.

As an example, suppose the encoder encodes two firing bits to define four firing levels. Each firing level corresponds to a different number of firings for the two firing bits. The different firing levels can be configured to cause one or more nozzles to fire multiple times. In one case, the four firing levels might dictate whether one pixel is fired zero times, one time, two times, or four times. In another case, the four firing levels might stipulate whether two pixels lay down zero dots, one dot, three dots, or eight dots. In still another case, the four firing levels might stipulate whether two pixels lay down zero dots, two dots, five dots, or eight dots.

The print head has multiple programmable registers to store values that define corresponding patterns of nozzle firings. The print head decoder decodes the firing bits from the encoder to select one of the programmable registers. The selected register outputs the value to print the corresponding firing pattern. The registered values can be changed as desired (such as every printing pass) to change the resulting firing pattern.

The multi-level encoding can be extended for many advantageous outcomes in addition to improving data throughput. For instance, the scheme may be used to improve print quality and mask image problems resulting from inoperable or malfunctioning nozzles. Another extension is to permit replacement of a malfunctioning nozzle by redefining the firing patterns to avoid use of the malfunctioning nozzle. These and other advantages are described below in the Detailed Description section.

BRIEF DESCRIPTION OF THE DRAWINGS

FIGS. 6(a)–6(d) illustrate a multi-level encoding technique involving two-passes, with different firing patterns in each pass.

DETAILED DESCRIPTION

Figure 1:
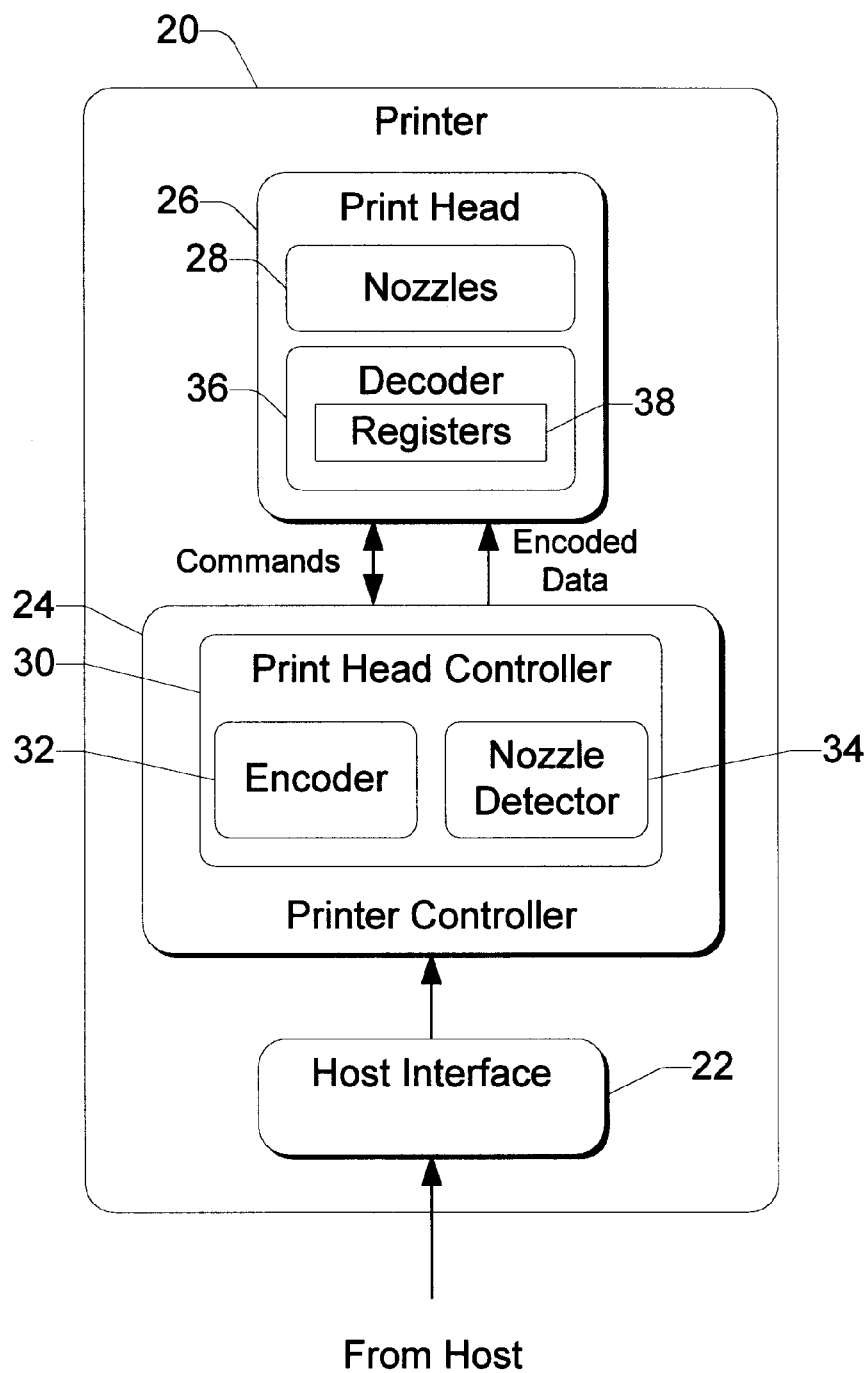
FIG. 1 is a block diagram of components in a printer.

FIG. 1 shows a printer 20, embodied in the form of an inkjet printer. The printer 20 is representative of an inkjet printer series manufactured by Hewlett-Packard Company under the trademark "Deskjet".

The illustrated components of printer 20 are a host interface 22, a printer controller 24, and a print head 26. Other components, such as the media handling mechanism, print head carriage, motor, power supply, and so forth, are not illustrated as they are well-known in the art.

The host interface 22 receives file data from a host computer (not shown). The host interface 22 passes the file data to the printer control unit 24, where it is processed into print head data and passed onto the print head 26 for printing. In addition to driving the print head, the printer control unit 24 controls various other printer operations, such as media handling and carriage movement for linear positioning of the print head 26 over a recording media (e.g., paper, transparency, etc.).

The print head 26 has multiple nozzles 28 that are fired individually to deposit drops of ink onto the recording media according to the data from the printer control unit. As an example, the print head might have 1200 nozzles.

The printer control unit 24 has a print head controller 30 to process incoming file data received at the host interface 22 and to convert the file data to print data. The print head controller 30 has a data encoder 32 to encode the file data into firing bits that determine firings of the print head nozzles 28. A "firing" is the action of applying a firing pulse to an individual nozzle to cause that nozzle to deposit an ink drop. The print head controller 30 also has a nozzle detector 34 that detects when one or more nozzles are not properly firing, resulting in omission of certain dots on the recording media.

The print head 26 has a decoder 36 mounted thereon to decode the firing bits into multiple firing pulses used to fire selected print head nozzles. Preferably, the decoder 36 is integrated into the print head firing logic. The decoder 36 has multiple registers 38 that define various firing patterns, which are selected by logic values of the firing bits.

According to an aspect of this invention, the encoder 32 encodes the print head data in such a manner that there are fewer firing bits than there are possible firings controlled by the firing bits. More particularly, the encoder 32 encodes the print head data such that "n" firing bits define $2^n$ different firing levels (where "n" is an integer), with each firing level defining a different number of firings. With the multi-level encoding, the encoder 32 is able to control more than $2^n$ possible firings with each n firing bits.

As an example, suppose that the encoder 32 encodes two firing bits (i.e., n=2) to define four different possible firing levels (i.e., $2^2$=4). Each firing level corresponds to a different number or pattern of firings for the two firing bits. The different firing levels can be configured to map to firing different sets of one or more nozzles multiple times. For instance, suppose the four firing levels are configured to dictate whether one pixel is fired zero times, one time, two times, or four times. This is the case of FIGS. 2(a)–2(d).

FIGS. 2(a)–2(d) illustrate the multi-level encoding technique in which four firing levels 0–3 (which are controlled by two firing bits) are mapped into a 4×1 array to control up to four possible firings. The 4×1 array consists of one row of four pixel locations, with each pixel location being represented as rectangles and referenced generally as number 50.

Figure 2A:
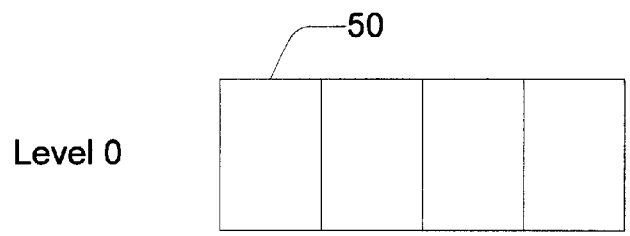
FIGS. 2(a)–2(d) illustrate a multi-level encoding technique implemented by the printer for a 4×1 super pixel.

FIG. 2(a) illustrates a level 0, which is selected by a first logic combination of firing bits (e.g., "00"). At level 0, each pixel location is empty as represented by the absence of a circle within the rectangle.

Figure 2B:
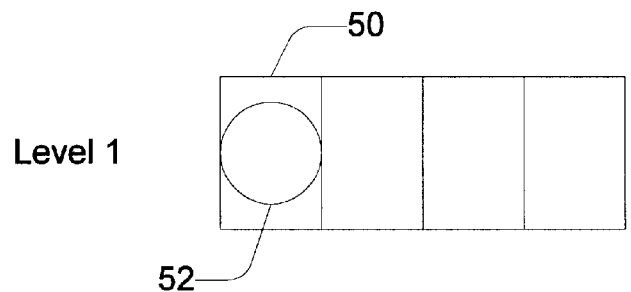

FIG. 2(b) illustrates a level 1, which is selected by a second logic combination of firing bits (e.g., "01"). At level 1, one ink dot is deposited in the first pixel location as represented by circle 52 within the left most rectangle.

Figure 2C:
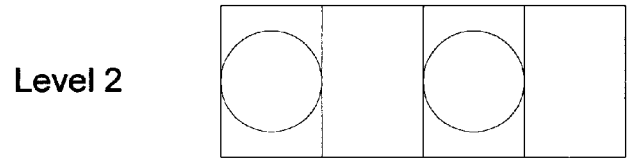

FIG. 2(c) illustrates a level 2, which is selected by a third logic combination of firing bits (e.g., "10"). At level 2, two ink dots are deposited in the first and third pixel locations.

Figure 2D:
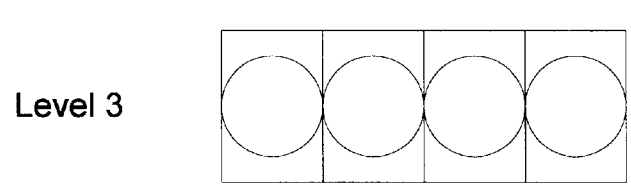

FIG. 2(d) illustrates a level 3, which is selected by a fourth logic combination of firing bits (e.g., "11"). At level 3, ink dots are deposited in all four pixel locations.

Some position information is lost as a result of the multi-level encoding scheme. In the implementation of FIGS. 2(a)–2(d), a level 1 (or, "01") maps to one ink dot in the first pixel location. The level 1 cannot map to one ink dot in, say, the fourth pixel location without being reprogrammed. But, the benefit of controlling more possible firings with fewer bits exceeds any drawback of losing precise position control.

Figure 3A:
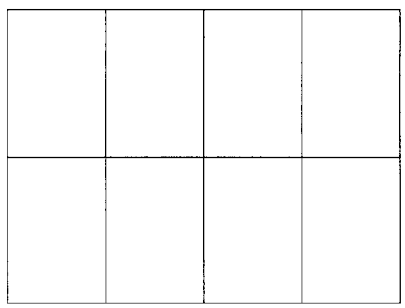
FIGS. 3(a)–3(d) illustrate a multi-level encoding technique implemented by the printer for a 4×2 super pixel.
Figure 3B:
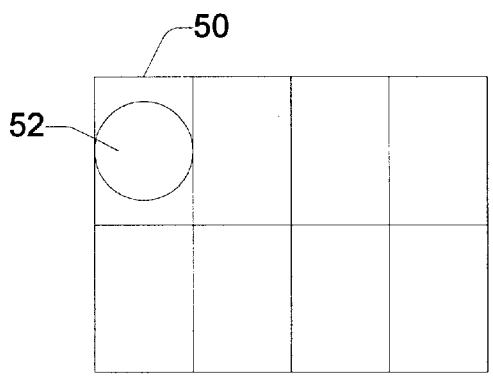

FIGS. 3(a)–3(b) illustrate the multi-level encoding technique for the case in which four firing levels are mapped onto a 4×2 array to control up to eight possible firings. FIG. 3(a) illustrates a level 0, which is selected by a first logic combination of firing bits (e.g., "00"). At level 0, each pixel location in the 4×2 array is left empty. FIG. 3(b) illustrates a level 1, which is selected by a second logic combination of firing bits (e.g., "01"). At level 1, one ink dot is deposited in the upper left pixel location.

Figure 3C:
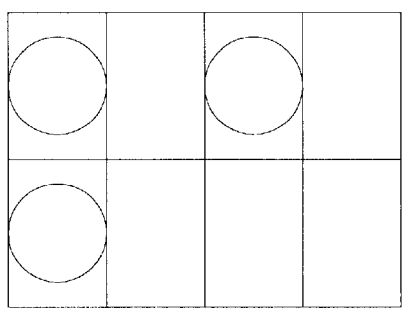
Figure 3D:
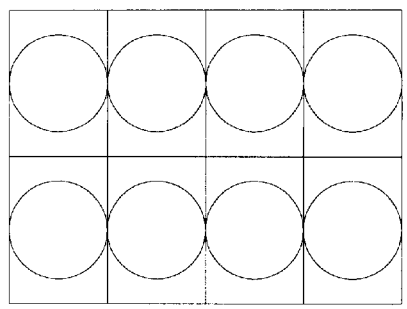

FIG. 3(c) illustrates a level 2, which is selected by a third logic combination of firing bits (e.g., "10"). At level 2, three ink dots are deposited in the first and third upper pixel locations and first lower pixel location. FIG. 3(d) illustrates a level 3, which is selected by a fourth logic combination of firing bits (e.g., "11"). At level 3, ink dots are deposited in all eight pixel locations. The firing patterns are provided for illustration, and other firing patterns for the given array may be used.

Figure 4:
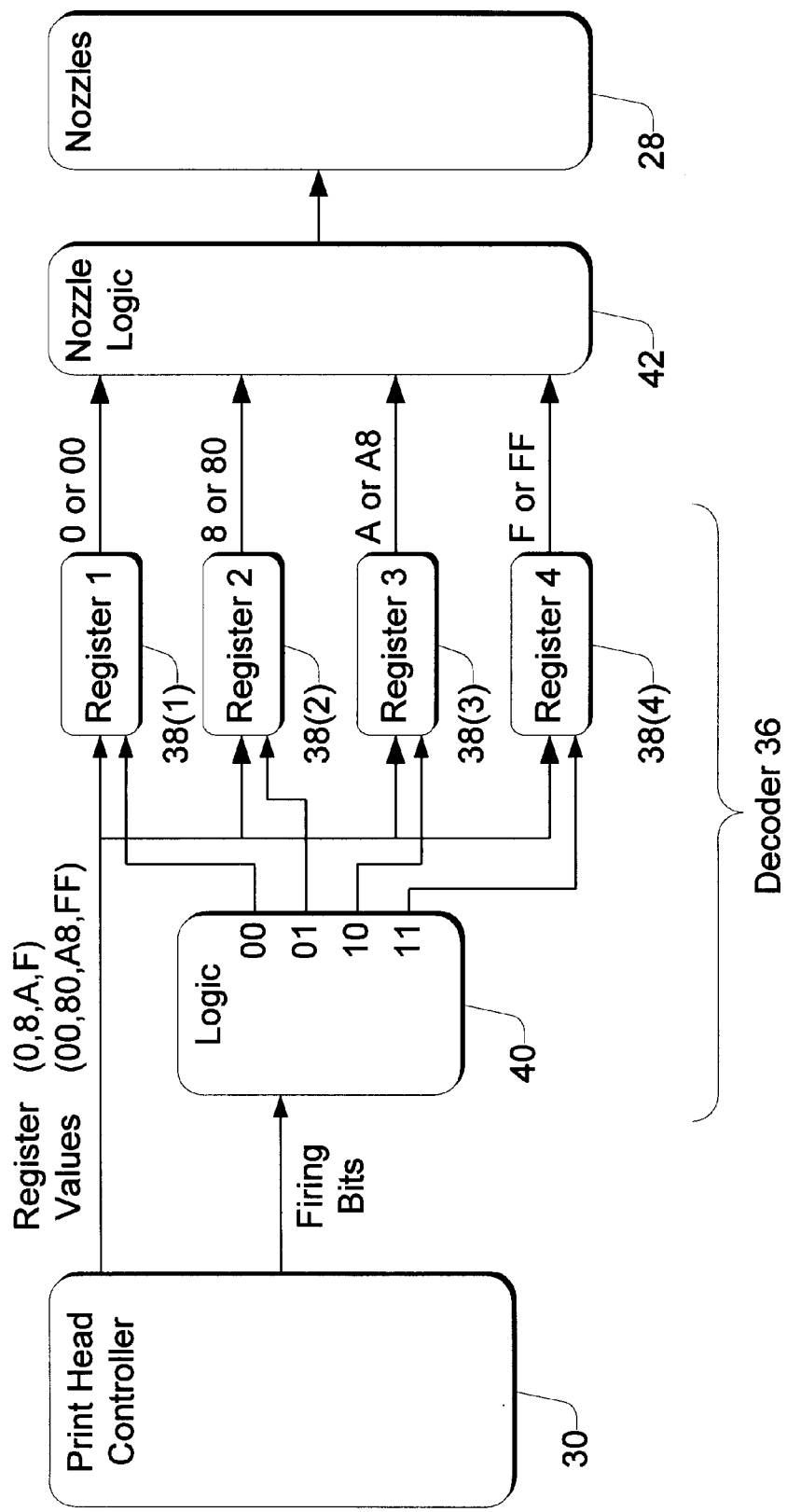
FIG. 4 shows a block diagram of a programmable print head.

Depending on the desired mapping, the print head controller 30 programs the print head 26 to convert the few firing bits (in this case, two firing bits) into different firing patterns consisting of many firings (up to eight firings for the FIG. 3 case). FIG. 4 shows how the print head 26 is programmed. The print head controller 30 occasionally sends to the print head 26 a set of register values that are stored in the print head registers 38. In this example, there are four registers 38(1)–38(4) and hence the print head controller 30 sends four register values each programming cycle. The register values are sent to the print head between printing swaths, so that the print head can be reprogrammed for each pass.

The particular register values define the desired firing patterns. In the case of FIGS. 2(a)–2(d), the print head controller 30 sends single digit Hexadecimal values 0, 8, A, and F to cause the firing patterns shown in respective FIGS. 2(a), 2(b), 2(c), and 2(d).

The decoder 36 has decoder logic 40 to select the appropriate register 38(1)–38(4) based on the two firing bits. For example, when the print head controller 30 outputs firing bits "00", the decoder logic 40 selects the first register 38(1), which outputs a firing value of 0 H. The existing print head nozzle logic 42 translates the 0 H value to mean leaving all four pixel locations empty, as shown in FIG. 2(a). Table 1 shows the conversion of the two firing bits to the firing patterns of FIGS. 2(a)–2(d).

TABLE 1

| Firing Bits | Register Value (Hex) | Firing Pattern |
| --- | --- | --- |
| 00 | 0 | FIG. 2(a) |
| 01 | 8 | FIG. 2(b) |
| 10 | A | FIG. 2(c) |
| 11 | F | FIG. 2(d) |

In the case of FIGS. 3(a)–3(d), the print head controller 30 sends two-digit Hexadecimal values 00, 80, A8, and FF to cause the firing patterns shown in respective FIGS. 3(a), 3(b), 3(c), and 3(d). One digit controls how a first nozzle prints the upper pixel locations and the second digit controls how a second nozzle prints the lower pixel locations. These values are also stored in registers 38(1)–38(4). Table 2 shows the conversion of the two firing bits to the firing patterns of FIGS. 3(a)–3(d).

TABLE 2

| Firing Bits | Register Value (Hex) | Firing Pattern |
|---|---|---|
| 00 | 00 | FIG. 3(a) |
| 01 | 80 | FIG. 3(b) |
| 10 | A8 | FIG. 3(c) |
| 11 | FF | FIG. 3(d) |

As illustrated in FIGS. 2–4, the firing bits effectively define a "super pixel" in which one or more nozzles can be fired multiple times per firing bit. The multi-level encoding technique for the case of two firing bits can be more generally stated as controlling up to Z firings (or ink drops), as noted by Table 3:

TABLE 3

| Firing Bits | Register Value | Number of Firings |
|---|---|---|
| First Binary Value | First Hex Value | None |
| Second Binary Value | Second Hex Value | X firings, where X > 0 |
| Third Binary Value | Third Hex Value | Y firings, where X ≦ Y ≦ Z |
| Fourth Binary Value | Fourth Hex Value | Z firings |

It is noted that the two firing bits may be used in conjunction with other arrays to produce other firing patterns. For instance, the two firing bits might be used in a 4×3 array, or a 4×4 array. Furthermore, while the above examples employ two firing bits, it is noted that more or less than two firing bits may be used in the multi-level encoding technique. With more firing bits, more levels are possible. For example, with three firing bits, the encoder can define eight levels, which allows control of more than eight possible firings for each three-bit input. With a single bit, there is only one level encoded, but this level can still be programmed to any desired number or pattern of drop firings when using this multi-level encoding technique.

The mutli-level encoding scheme allows the print head controller 30 to output fewer bits per second, without a drop off in printing throughput or degrading print quality.

Another aspect of this invention concerns extending the multi-level encoding technique to improve print quality and mask image problems resulting from inoperable or malfunctioning nozzles. In this embodiment, the print head decoder 36 uses two or more sets of registers and the print head automatically uses both register sets for each group of firing bits.

FIGS. 5(a)–5(d) illustrate an extension of the firing scheme described above with respect to FIG. 3. In this example, the print head decoder 36 has two sets of four registers for controlling two different 4×2 super pixels 60(1) and 60(2). A first set of registers defines the firing patterns of super pixel 60(1) and a second set of registers defines the firing patterns of super pixel 60(2). The first set of registers are programmed with two-digit register values that define the firing patterns in the first super pixel 60(1), such as values 00, 80, A8, and FF. The second set of registers are programmed with two-digit register values that define the firing patterns in the second super pixel 60(2), such as values 00, 08, 8A, and FF. The super pixels are then alternated during a printing pass.

As one possible method, the encoder 32 encodes just two firing bits, and the decoder logic 40 alternates the firing bits between the two sets of registers to output alternating register values to the nozzle logic 42. In this manner, two firing bits are controlling up to sixteen firings.

Figure 5A:
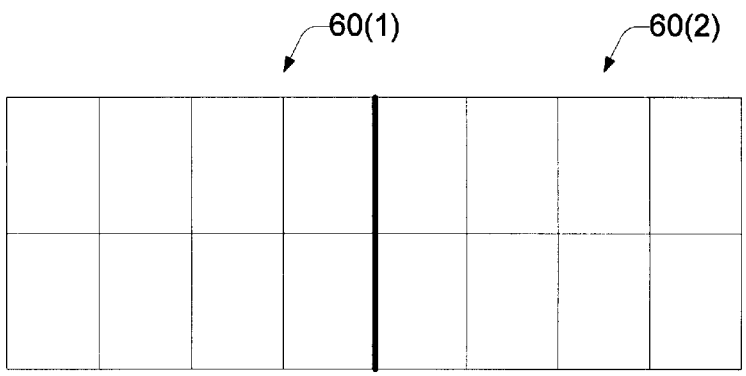
FIGS. 5(a)–5(d) illustrate a multi-level encoding technique in which alternate super pixels use alternating encoding values.
Figure 5B:
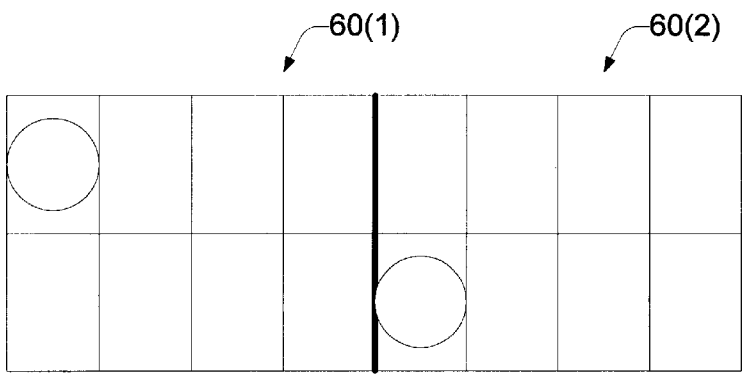

FIG. 5(a) illustrates a level 0, which is selected by a firing bit value of "00". At level 0, each pixel location in both 4×2 super pixels is left empty. The firing bit "00" thereby selects a register from each set, wherein the register value for both registers is 00H. FIG. 5(b) illustrates a level 1, which is selected by a firing bit value of "01". At level 1, one ink dot is deposited in the upper left pixel location in super pixel 60(1) and one ink dot is deposited in the lower left pixel location in super pixel 60(2). The firing bit "01" thus selects a register from the first set that has a register value 80H and a register from the second set that has a register value 08H.

Figure 5C:
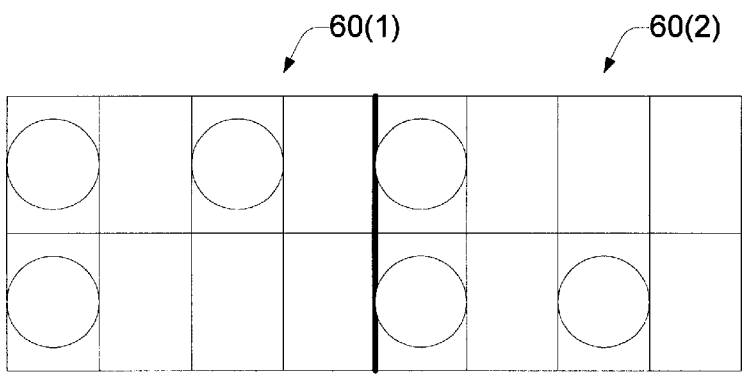
Figure 5D:
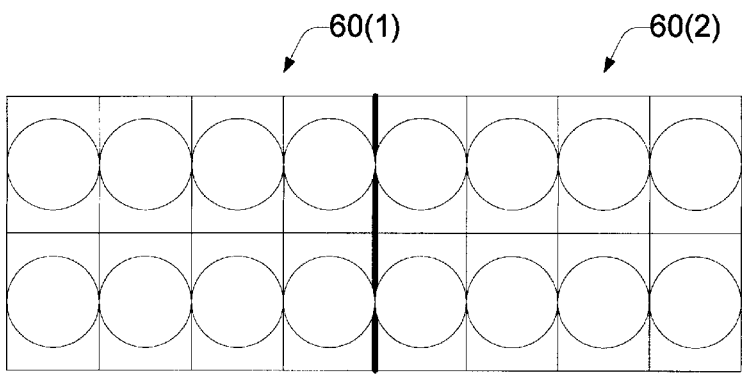

FIG. 5(c) illustrates a level 2, which is selected by a firing bit value of "10". At level 2, three ink dots are deposited in the first and third upper pixel locations and first lower pixel location of super pixel 60(1). Additionally, three ink dots are deposited in the first upper pixel location and the first and third lower pixel locations of super pixel 60(2). Thus, the firing bit "01" selects a register from the first set that has a register value A8H and a register from the second set that has a register value 8AH. FIG. 5(d) illustrates a level 3, which is selected by a firing bit value of "11". At level 3, ink dots are deposited in all eight pixel locations for both super pixels 60(1) and 60(2). Thus, the firing bit "11" selects a register from each set, wherein the register value for both registers is FFH. Table 4 summarizes scheme.

TABLE 4

| Firing Bits | Register Value In First Set (Hex) | Register Value in Second Set (Hex) | Firing Pattern |
|---|---|---|---|
| 00 | 00 | | No dots |
| | | 00 | No dots |
| 01 | 80 | | 1 dot, upper left |
| | | 08 | 1 dot, lower left |
| 10 | A8 | | 3 dots, two upper, one lower |
| | | 8A | 3 dots, one upper, two lower |
| 11 | FF | | All dots |
| | | FF | All dots |

This multi-level encoding scheme improves print quality because each super pixel is made up of multiple nozzles. Two nozzles produce alternating firing pattern shown in FIGS. 5(a)–5(d). During normal operation, the same number of dots are deposited in both nozzle rows. If one nozzle should malfunction during operation, the other nozzle will deposit at least some ink on the recording media, which is beneficial to the viewing eye for all tones.

In the above examples, the print head registers are global in that they provide firing patterns to all super pixels. A variation is to use more registers to define sections of super pixels, with each set of registers controlling one section of super pixels.

Another aspect of this invention concerns extending the multi-level encoding technique to facilitate multi-pass printing. This aspect allows the printer to perform passive redundancy and active nozzle replacement. In this embodiment, the print head controller 30 programs the registers with new values between each pass. In the first pass, the values define a first firing pattern. In the next pass, the new values define a second firing pattern that is different from the first firing pattern.

Figure 6C:
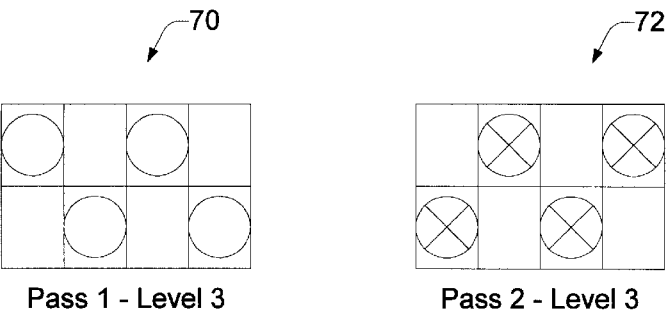
Figure 6C:
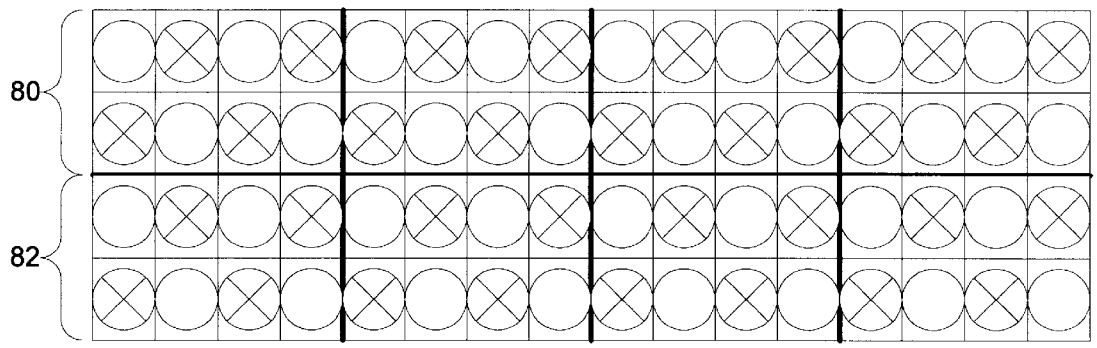

FIGS. 6(a)–6(d) illustrate a multi-level encoding scheme of multi-pass printing. FIG. 6(a) shows a 4×2 super pixel having a four dot firing pattern 70 with two dots in the first and third upper pixel locations and two dots in the second and fourth lower pixel locations. This firing pattern is selected on the first pass using level three encoding (e.g., a firing bit value of "11"). FIG. 6(b) shows the 4×2 super pixel having a four dot firing pattern 72 with two dots in the second and fourth upper pixel locations and two dots in the first and third lower pixel locations. This firing pattern is selected on the second pass using level three encoding (e.g., a firing bit value of "11"). The drops in firing pattern 72 are represented as circles with an "X" to differentiate them from the dots in the first pass.

During a first pass, the print head controller 30 sends a first set of values to the registers to create the first firing pattern 70. The dots represented by the circles without the "X" are printed on the recording media. After the first pass, the print head controller 30 sends a second set of values to the registers to create the second firing pattern 72. The dots represented by the circle with the "X" are printed.

FIG. 6(c) shows the resulting pattern after two passes of normal printing. The two firing patterns 70 and 72 interleave to form a super pixel having eight dots. The two passes produce two super pixel rows 80 and 82.

Figure 6D:
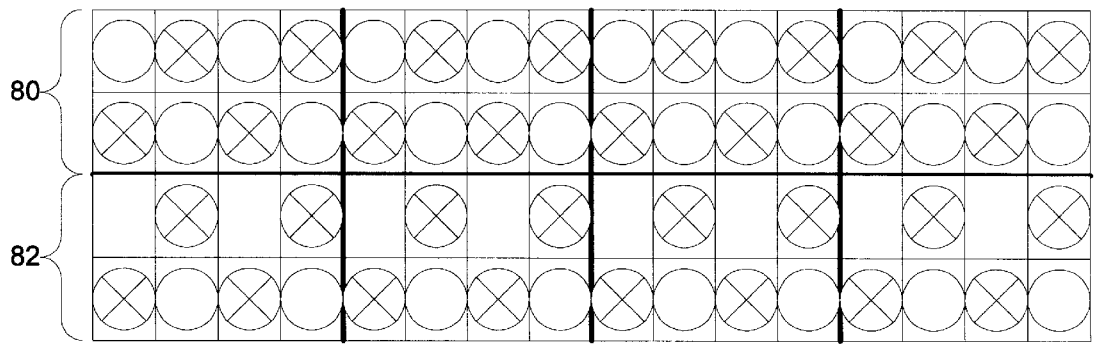

Now, suppose that one nozzle in the super pixel becomes defective. FIG. 6(d) illustrates two super pixel rows 80 and 82. Here, the upper pixel used to create the first firing pattern 70 in the second row of super pixels is inoperable, as represented by the omission of every other circle in the upper line of the second row 82. An advantage of this multi-level encoding scheme is that even though one nozzle is missing, only 25% of a super pixel is lost. That is, only two dots out of eight are dropped. While the image is somewhat lesser in quality, the resulting image is significantly better than the case where an entire row of dots is dropped.

The printer can also be configured to detect the malfunctioning nozzle and replace it by changing the encoding scheme. As shown in FIG. 1, the printer is equipped with a nozzle detector 34 to sense when a nozzle is working improperly. Upon detection, the printer switches to a new encoding level to compensate for the lost nozzle.

Figure 7A:
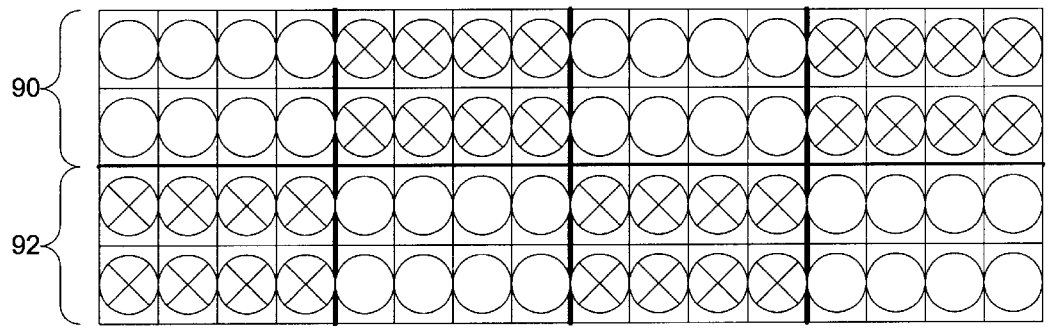
FIGS. 7(a)–7(b) illustrate a multi-level encoding technique to compensate for defective nozzles.
Figure 7B:
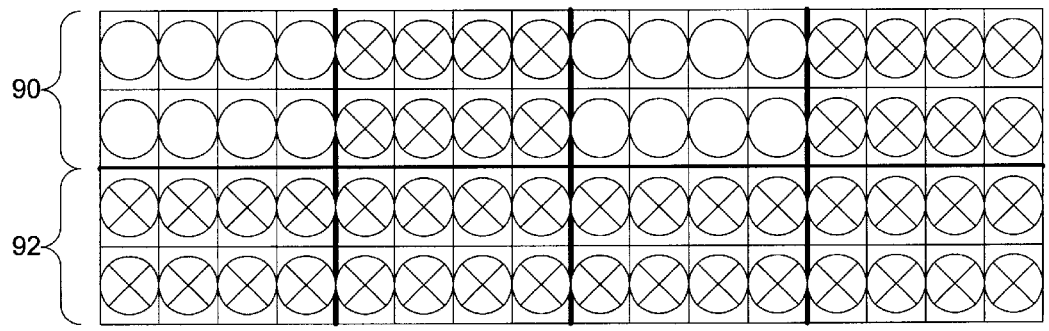

FIGS. 7(a) and 7(b) illustrate this aspect of detecting and replacing the malfunctioning nozzle. The print head controller 30 outputs two bits of data for each super pixel. Under normal conditions prior to pixel failure, the print head controller outputs level 0 (i.e., firing bits "00") for one-half of the super pixels and level 3 (i.e., firing bits "11") for the other half of the pixels. Note that this version uses the super pixel programming values of FIGS. 3(a)–3(d) and not the version in FIGS. 6(a)–6(d). The printer controller changes the levels between the two passes. The result is a checker board pattern in which the "X'd squares" (referring to the super pixels with X'd circles) are printed on one pass and the "non-X'd squares" (referring to the super pixels with circles only) are printed on the other pass.

FIG. 7(a) shows two rows 90 and 92 that are created under this multi-pass scheme. Now, suppose that one nozzle in row 92 is detected as bad. The print head assigns a level 0 to all super pixels in that row on the first pass and then resets all super pixels in the row to level three (i.e., firing bits "11") on the second pass. FIG. 7(b) shows the resulting output. The printing scheme compensates for an otherwise missing pixel by employing an alternate super pixel to print the row.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A printer comprising:
a print head having multiple nozzles;
an encoder to encode print head data into firing bits used to determine firings of the print head nozzles, the encoder encoding the print head data in such a manner that there are fewer firing bits than firings controlled by the firing bits; and
a decoder integrated on the print head to decode the firing bits into firing pulses used to fire selected print head nozzles.

2. A printer as recited in claim 1, wherein the encoder is configured to encode the print head data such that n firing bits define $2^n$ firing levels, each firing level comprising a different number of firings.

3. A printer as recited in claim 2, wherein the encoder is configured to encode the print head data such that the n firing bits control more than n possible firings.

4. A printer as recited in claim 2, wherein the print head has one or more programmable registers that define, for each firing level, a corresponding pattern of firings.

5. A printer as recited in claim 4, wherein the encoder is configured to send control data to the print head to program the programmable registers.

6. A printer as recited in claim 4, wherein the encoder is configured to send control data to the print head to program the programmable registers between passes.

7. A printer as recited in claim 4, further comprising a nozzle detector to detect when a nozzle is malfunctioning, the encoder reprograms the programmable registers to produce different firing patterns that compensate for the malfunctioning nozzle.

8. A printer as recited in claim 1, wherein the encoder is configured to encode the print head data such that two firing bits control up to Z firings as follows:

| Firing Bits | Number of Firings |
| --- | --- |
| First Binary Value | None |
| Second Binary Value | X firings, where $X > 0$ |
| Third Binary Value | Y firings, where $X \leq Y \leq Z$ |
| Fourth Binary Value | Z firings |

9. A printer as recited in claim 1, wherein the decoder is configured to decode the firing bits into multiple different firing patterns.

10. A printer as recited in claim 1, wherein the decoder is configured to automatically output two or more different firing patterns for each group of firing bits received from the encoder.

11. A printer as recited in claim 1, wherein the encoder is configured to encode the print head data for multi-pass printing in which the print head is moved along one swath path multiple times, the encoder encoding the print head data such that the firing bits define one pattern of firings in a first traverse of the print head over the swath being printed and a second pattern of firings in a second traverse of the print head over the swath being printed.

12. A printer as recited in claim 1, wherein the firing bits are configured to define a super pixel comprising one or more nozzles that can be fired multiple times.

13. A programmable print head comprising:
multiple programmable registers to store values that define corresponding patterns of nozzle firings; and
a decoder to decode incoming data bits and to select one of the programmable registers, the selected register outputting a value that causes the print head to print the corresponding firing pattern.

14. A programmable print head as recited in claim 13, wherein the programmable registers can be programmed to store a different set of values to define different corresponding firing patterns.

15. In a printer having a print head with multiple nozzles, a method comprising the following steps:

encoding print head data into firing bits used to determine a pattern of firings of the print head nozzles such that a number of possible firings within the pattern is greater than a number of the firing bits; and decoding the firing bits at the print head to fire selected print head nozzles to produce the pattern.

16. A method as recited in claim 15, wherein the encoding step comprises the step of using n firing bits to define $2^n$ firing levels, with each firing level comprising a different pattern of firings.

17. A method as recited in claim 15, wherein the encoding step comprises the step of using n firing bits to control more than n possible firings.

18. A method as recited in claim 15, wherein the print head has one or more programmable registers that hold values defining a corresponding firing pattern, further comprising the step of programming the registers to define different firing patterns.

19. A method as recited in claim 18, further comprising the following steps:

detecting when a nozzle is malfunctioning; and reprogramming the registers to produce different firing patterns that compensate for the malfunctioning nozzle.

* * * * *